United States Patent [19]

Rakszawski

[11] Patent Number: 5,290,455
[45] Date of Patent: Mar. 1, 1994

[54] REMOVAL OF CYANIDE FROM AQUEOUS STREAMS

[75] Inventor: John Rakszawski, Basking Ridge, N.J.

[73] Assignee: The BOC Group, Inc., New Providence, N.J.

[21] Appl. No.: 913,257

[22] Filed: Jul. 14, 1992

[51] Int. Cl.$^5$ .............................................. C02F 1/72
[52] U.S. Cl. ........................... 210/763; 204/DIG. 13; 210/904
[58] Field of Search ............... 210/758, 763, 904, 761, 210/762; 75/737; 204/DIG. 13; 423/29, 143, 144

[56] References Cited

U.S. PATENT DOCUMENTS 4,537,686  8/1985  Borbely et al. ..................... 210/763
5,015,396  5/1991  D'Orazio et al. ................... 210/763

FOREIGN PATENT DOCUMENTS 49-134163 12/1974 Japan.

*Primary Examiner*—Robert A. Dawson
*Assistant Examiner*—Sun Uk Kim
*Attorney, Agent, or Firm*—Coleman R. Reap; Larry R. Cassett

[57] ABSTRACT

Cyanide present in aqueous streams, such as effluents from electroplating and gold mining operations is reduced or eliminated by contacting the cyanide-containing stream with oxygen and carbon dioxide in the presence of ferrous ions, nickelous ions or cobaltous ions. The oxygen may be provided by air or oxygen and the contacting is carried out until the pH of the aqueous stream is reduced to a value in the range of about 6 to 8 and preferably 6.5 to 7.5.

20 Claims, No Drawings

REMOVAL OF CYANIDE FROM AQUEOUS STREAMS

BACKGROUND OF THE INVENTION

1. Field Of The Invention

This invention relates to the removal of cyanide ions from aqueous streams, and more particularly to the removal of cyanide ions from industrial process waste water streams.

Cyanides are used in a variety of industrial processes that are carried out in aqueous media, such as the recovery of gold from ore and electroplating. Many gold mining operations use cyanide solutions to leach gold from the ore. After removal of the gold most of the leaching solution is recycled. However, a portion of the leaching solution is discharged as waste water to avoid accumulation of other metals. In metal plating, discharges of cyanide result from the rinsing of finished products from cyanide-type plating operations. This step likewise results in the discharge of considerable amounts of cyanide into waste water streams. Because of its extremely toxic nature cyanide in waste water streams must be destroyed before disposal of the stream.

2. Prior Art

Various techniques have been employed to destroy residual cyanides in waste water streams or to convert them to less toxic compounds. One technique commonly used is to convert the cyanides to less toxic cyanide complexes such as ferrocyanides and ferricyanides by the reaction of iron salts with the free cyanides. The resulting cyanide complexes are generally precipitated and removed from the aqueous stream as sludge. Unfortunately, this method of cyanide treatment results in the formation of considerable quantities of sludge. Furthermore, if the sludge is exposed to the environment the ferrocyanides and ferricyanides may be decomposed to free cyanides by the action of sunlight.

Another procedure for eliminating cyanides from aqueous streams involves the conversion of the cyanides to relatively harmless cyanates, which eventually break down and are released to the atmosphere as carbon dioxide and ammonia. Hydrogen peroxide, carbon dioxide and dilution water have been used in some western United States gold mining operations to reduce the amount of cyanide in tailings. The cyanide is apparently converted to cyanate. D. Muir, in an article entitled "Recent Advances In Gold Metallurgy", published in Symp. Ser. Australias. Inst. Min. Metall., 1987, 51 (Res. Dev. Extr. Metall.), 1–10, discloses the oxidation of cyanide to cyanate and eventually to carbonate and ammonia by contacting the cyanide with oxygen and carbon catalyst in the presence of $Cu^{++}$ ions. Another method for converting cyanide in waste water streams to cyanate is disclosed in U.S. Pat. No. 4,537,686. The procedure described in this patent comprises contacting the cyanide with sulfur dioxide and oxygen in the presence of a copper catalyst, such as $CuSO_4$. This process is effective, however it is costly and involves the use of sulfur dioxide, which itself is toxic and difficult to handle. Another possible disadvantage of this process is the fouling of process equipment as a result of the formation of insoluble compounds, such as calcium sulfate, when alkaline earth metal ions are present in the slurry.

U.S. Pat. No. 5,015,396 discloses the removal of cyanide from aqueous streams by contacting the streams with an oxygen-containing gas stream in the presence of carbon dioxide and a water-soluble reducible metal catalyst, preferably a metal catalyst selected from ferric salts and cupric salts. The preferred system of this patent is effective for removing cyanides from aqueous streams, but as shown in the example of this patent, the treated stream still contains a significant quantity of cyanide ion.

The growing use of cyanide in industrial water-based processes has resulted in the development of large volume cyanide-containing industrial waste water effluent streams and the creation of many cyanide-containing industrial waste ponds. These effluents and ponds present a constant hazard because of the danger of pollution of fresh water supplies from spills. Consequently, there is an ongoing need for more effective methods for removing cyanides from aqueous streams. The method of the present invention fulfills that need.

SUMMARY OF THE INVENTION

According to the invention, cyanide ions that are present in an aqueous stream, such as a body of water or an effluent from an industrial process, are destroyed by contacting the cyanide-containing aqueous stream with oxygen and carbon dioxide in the presence of a water-soluble reduced metal oxidizing catalyst selected from ferrous ($Fe^{++}$) salts, nickelous ($Ni^{++}$) salts, cobaltous ($Co^{++}$) salts and mixtures of these. Generally, the oxygen is present in an amount sufficient to produce the desired degree of cyanide conversion, the carbon dioxide is added in an amount sufficient to reduce the pH to the desired value and the reaction is carried out until the pH of the aqueous stream is in the range of about 6 to 8. The oxygen to cyanide molar ratio is usually maintained in the range of about 0.02 to about 20:1.

In preferred embodiments, the oxygen to cyanide molar ratio is maintained in the range of about 0.04 to about 10:1, the reaction is carried out until the pH of the aqueous medium is in the range of about 6.5 to about 7.5, and the water-soluble catalyst is a $Fe^{++}$ salt.

DETAILED DESCRIPTION OF THE INVENTION

The invention may be practiced on a batch, semi-batch, or continuous basis and it may be applied to the treatment of a standing body of water or moving water. The term "aqueous stream", as used in this description, applies to either standing bodies of water or moving streams of water.

The method of introducing the oxygen and carbon dioxide into the aqueous stream being treated is not critical. The gases may be added separately or as a gaseous mixture, and, although it is usually desirable to inject them into the aqueous stream on a continuous basis, they may be intermittently introduced into the stream. The oxygen may be introduced into the contact zone either as pure oxygen or as part of a gaseous mixture, such as air. In some cases it is preferred to use oxygen rather than air because of the increased efficiency attained when using oxygen. However in other cases air is preferred because of its lower cost.

The amounts of oxygen and carbon dioxide maintained in the contact zone during the reaction period is not critical. The lower limits of these reagents will be determined by the degree of cyanide removal that is desired in the aqueous stream being treated, and the upper limits are bounded by economics. Aside from these considerations, the amounts of oxygen and carbon dioxide introduced into the aqueous stream being treated generally depends upon the amount of cyanide present in the stream. As noted above, sufficient oxygen is usually added to provide an oxygen to cyanide molar ratio in the range of about 0.02 to about 20 1, i.e. about 0.02 to about 20 moles of oxygen are added for each mole of cyanide present in the contact zone of the aqueous stream. In preferred embodiments, the molar ratio of oxygen to cyanide in the contact zone is generally maintained in the range of about 0.04 to about 10:1. As also indicated above, the amount of carbon dioxide introduced into the aqueous stream is usually sufficient to reduce the pH of the aqueous medium being treated to a value in the range of about 6 to about 8, and preferably, sufficient carbon dioxide is added to reduce the pH of the aqueous medium to a value in the range of about 6.5 to about 7.5.

Any water-soluble $Fe^{++}$, $Ni^{++}$, $Co^{++}$ salt or mixture of these salts can be used in the process of the invention. Water-soluble $Fe^{++}$ salts are preferred because they are generally less expensive, less toxic and more effective than water-soluble $Ni^{++}$ and Co salts. Typical of the water-soluble salts of $Fe^{++}$, $Ni^{++}$ and $Co^{++}$ useful in the invention are the chlorides, nitrates, sulfates, acetates, etc. of these ions. Particularly preferred salts are $FeCl_2$, $FeSO_4$, $Fe(NO_3)_2$ and mixtures of these. The concentration of catalyst maintained in the reaction zone during the reaction period is a matter of choice. Factors influencing this choice are the concentration of cyanide present in the aqueous stream being treated and the degree of cyanide removal sought. In general, it is preferred to add sufficient catalyst to the aqueous stream to destroy substantially all of the cyanide present in the stream. This is usually accomplished by adding sufficient catalyst to provide a metal ion to cyanide ion mole ratio of at least about 0.2:1.

The aqueous solutions being treated usually have a high pH, for example above about 10. During the course of the reaction of the invention the pH of the solution being treated is reduced by additions of carbon dioxide desirably to a value of 8 or less and preferably to value in the range of about 6 to 8. In the most preferred embodiments of the invention sufficient carbon dioxide is added to lower the pH of the aqueous medium to a value in the range of about 6.5 to about 7.5.

The temperature and pressure in the contact zone are not critical, although the reaction kinetics is influenced by the temperature and pressure of the aqueous stream being treated. The temperature of the aqueous stream entering the reaction zone is generally in the range of about 10° to about 90° C. Most commonly, the temperature of the aqueous stream entering the contact zone is in the range of about 20° to about 40° C. With respect to pressure, it is usually more economical to conduct the reaction at atmospheric pressure or at moderate pressures. Higher pressures than those generally prevailing in the equipment or pipeline carrying the aqueous stream being treated should be avoided because of the increased equipment costs associated with high pressure operations.

As noted above, the principal advantages of the invention over the currently used methods of reducing or eliminating cyanide in aqueous streams are increased effectiveness and reduced cost and toxicity. For example, carbon dioxide is less expensive than the sulfur dioxide used in the process of U.S. Pat. No. 4,537,686 and carbon dioxide is nontoxic, whereas, as noted above, sulfur dioxide is quite toxic. In addition to these advantages, the process of the present invention, when carried out until the pH of the aqueous stream being treated is in the range of about 6.5 to about 7.5, usually results in the formation of soluble bicarbonate salts, due to reaction between the carbonic acid by-product and metal cations commonly present in the aqueous streams being treated. Bicarbonate salts are preferred because they do not form scale on the internal walls of the process equipment. On the other hand, the use of sulfur dioxide often results in the formation of scale-forming insoluble salts due to the reaction of by-product sulfuric acid with alkaline earth metal cations present in the aqueous streams being treated. This is particularly the case when the stream being treated contains large quantities of calcium, which reacts with sulfate ion to form water-insoluble gypsum, a compound which has a tendency to form scale on the inside surface of equipment.

The invention is further illustrated by the following example in which, unless otherwise indicated, parts, percentages and ratios are on a molar basis. In the example the cyanide concentration was measured by means of an Orion Cyanide Selective Ion Electrode, Research Model 94-06, following the manufacturer's instructions.

EXAMPLE

Several runs were conducted using approximately 500 gram samples of aqueous cyanide solutions in a one liter glass reaction kettle equipped with a magnetic stirrer and an Orion electrode for continuously measuring the pH of the solution. The aqueous cyanide solutions were prepared by dissolving sodium cyanide in the water samples. The water-soluble catalyst, in the form of aqueous solutions, was added to the reaction kettles and carbon dioxide and oxygen were bubbled through the cyanide solutions at flow rates of 15 and 10 cc/min., respectively. The final cyanide concentration was determined when the pH reached 7. The details of the runs and the results obtained are reported in the following table.

TABLE

| Run | Catalyst | $CN^-$ Conc, ppm Initial | $CN^-$ Conc, ppm Final | Mol Cation per mol CN | Run Time, min | pH Initial | pH Final |
| --- | --- | --- | --- | --- | --- | --- | --- |
| 1 | None | 290 | 240 | — | 10 | 11 | 7 |
| 2 | $FeSO_4$ | 285 | <0.1 | 0.28 | 2 | 10.9 | 7 |
| 3 | $Ni(NO_3)_2$ | 280 | <0.1 | 0.33 | 3 | 10.8 | 7 |
| 4 | $CoCl_2$ | 280 | <0.1 | 0.33 | 2 | 10.9 | 7 |
| 5 | $FeSO_4$ | 620 | <0.1 | 0.35 | 5 | 10.9 | 7 |
| 6 | $Co(NO_3)_2$ | 620 | <0.1 | 0.38 | 8 | 10.9 | 7 |
| 7 | $NiCL_2$ | 620 | 0.68 | 0.38 | 4 | 10.9 | 7 |
| 8 | $FeSO_4$ | 1200 | 0.65 | 0.20 | 2 | 10.9 | 7 |
| 9 | $Co(NO_3)_2$ | 1200 | 0.12 | 0.20 | 5 | 10.8 | 7 |
| 10 | $CuSO_4$ | 310 | 150 | 0.26 | 7 | 10.2 | 6.9 |
| 11 | $Fe_2(SO_4)_3$ | 350 | 280 | 0.68 | 15 | 11.1 | 7 |
| 12 | $MnCl_2$ | 280 | 210 | 0.43 | 12 | 11.0 | 7 |

TABLE-continued

| Run | Catalyst | CN⁻ Conc, ppm Initial | CN⁻ Conc, ppm Final | Mol Cation per mol CN | Run Time, min | pH Initial | pH Final |
|---|---|---|---|---|---|---|---|
| 13 | ZnSO$_4$ | 360 | 340 | 0.33 | 12 | 11.1 | 7 |

The Table illustrates the benefits provided by the invention. In Run 1, which served as a control, no water soluble metal catalyst was used. As shown in the Table, very little cyanide was removed from the test solution. In Runs 2-6, in which a water soluble catalyst of the invention was used at levels of 0.28 to 0.38 moles of cation per mole of cyanide ion, the cyanide ion concentration was reduced to less than 0.1 ppm. In Runs 8 and 9, the water soluble catalyst was used at a level of 0.2 moles per mole of cyanide ion, and the cyanide ion concentration was reduced to less than 1 ppm. On the other hand, in comparative examples 10-13, when water-soluble catalysts falling outside the scope of the claims were used, very little cyanide ion was removed from the test solutions.

Although the invention is described with particular reference to a specific example, it is understood that variations are contemplated. For example, carbon dioxide and oxygen can be added as a mixture of gases, or air can be used as the source of oxygen. Also, as an alternative procedure the invention can be practiced in a series of stages. The scope of the invention is limited only by the breadth of the appended claims.

What is claimed is:

1. A method of reducing the concentration of cyanide in a cyanide-containing aqueous stream comprising contacting the aqueous stream in a reaction zone with an oxygen-containing gas and carbon dioxide in the presence of a water-soluble catalyst comprising ferrous ions, nickelous ions, cobaltous ions or mixtures of these.

2. The method of claim 1 wherein said oxygen-containing gas is selected from oxygen and air.

3. The method of claim 1 wherein said water-soluble catalyst comprises ferrous ions.

4. The method of claim 3 wherein said water-soluble catalyst is ferrous chloride, ferrous sulfate, ferrous nitrate or mixtures of these.

5. The method of claim 4 wherein said water-soluble catalyst is ferrous chloride.

6. The method of claim 1 wherein the pH of the aqueous stream being treated is reduced to a value in the range of about 6 to about 8 during the course of the treatment.

7. The method of claim 3 wherein the pH of the aqueous stream being treated is reduced to a value in the range of about 6.5 to about 7.5 during the course of the treatment.

8. The method of claim 6 wherein the molar concentration of oxygen in the reaction zone is in the range of about 0.02 to about 20 moles per mole of cyanide present in said aqueous stream.

9. The method of claim 7 wherein the molar concentration of oxygen in the reaction zone is in the range of about 0.04 to about 10 moles per mole of cyanide present in said aqueous stream.

10. A method of reducing the concentration of cyanide in a cyanide-containing aqueous stream comprising contacting the aqueous stream in a contacting zone with an oxygen-containing gas and carbon dioxide in the presence of a water-soluble catalyst containing the $Fe^{++}$ ion, the $Ni^{++}$ ion, the $Co^{++}$ ion or mixtures of these, the concentration of said oxygen-containing gas in the contacting zone being sufficient to provide an oxygen concentration in the range of about 0.02 to about 20 moles per mole of cyanide present in said aqueous stream, the amount of carbon dioxide added to the aqueous stream being sufficient to reduce the PH of the aqueous stream to a value in the range of about 6 to about 8, and the amount of water-soluble catalyst present in the contacting zone is at least about 0.2 mole per mole of cyanide ion present in the aqueous stream.

11. The method of claim 10 wherein said water-soluble catalyst is a water-soluble ferrous salt.

12. The method of claim 11 wherein said ferrous salt is ferrous chloride, ferrous sulfate, ferrous nitrate or mixtures of these.

13. The method of claim 11 wherein the treatment is terminated when the pH of the aqueous stream reaches a value in the range of about 6.5 to about 7.5.

14. A method of treating aqueous gold mining tailings effluent to destroy residual cyanide contained in said effluent comprising contacting said effluent in a contact zone with an oxygen-containing gas and carbon dioxide in the presence of a water-soluble ferrous metal catalyst until the pH of the effluent reaches a value of about 8 or less.

15. The method of claim 14 wherein the oxygen-containing gas is selected from the group consisting of oxygen and air.

16. The method of claim 15 wherein, in the contact zone, the molar ratio of oxygen to cyanide ion is in the range of about 0.02 to about 20:1 and the mole ratio of ferrous ion to cyanide ion is at least about 0.2 to 1.0.

17. The method of claim 16 wherein said water-soluble ferrous catalyst comprises a ferrous salt.

18. The method of claim 17 wherein said ferrous salt is ferrous chloride, ferrous sulfate, ferrous nitrate or mixtures of these.

19. The method of claim 18 wherein the treatment is carried out until the pH of the effluent leaving the contact zone is in the range of about 6.5 to about 7.5.

20. The method of claim 19 wherein, in the contact zone, the molar ratio of oxygen to cyanide ion is in the range of about 0.04 to about 10:1.

* * * * *